July 16, 1957 S. E. WEBBER 2,799,828

MAGNETRON AND SYSTEMS THEREFOR

Filed Aug. 11, 1950

Inventor:
Stanley E. Webber,
by Paul A. Frank
His Attorney.

2,799,828

MAGNETRON AND SYSTEMS THEREFOR

Stanley E. Webber, Ballston Lake, N. Y., assignor to General Electric Company, a corporation of New York Application August 11, 1950, Serial No. 178,837

8 Claims. (Cl. 332—5)

Figure 1:
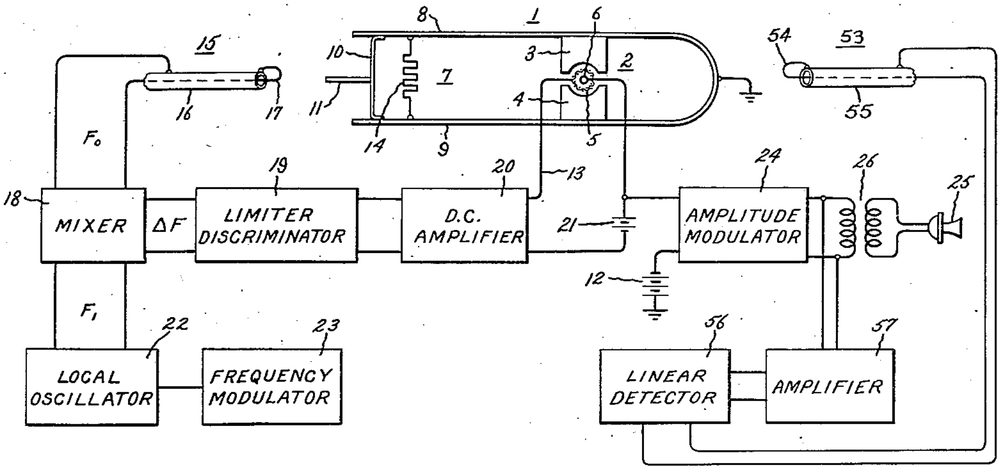

This invention relates to high frequency systems and more particularly to novel magnetron apparatus employing magnetron-type oscillators for the generation of frequency modulated oscillations or for the generation of electromagnetic oscillations of stabilized frequency.

It is a general object of the present invention to provide a system of transmitting distortion-free intelligence by means of modulated electromagnetic waves of ultra-high frequency and practicably useful power levels.

It is a further object of this invention to provide a system employing a magnetron having a grid for the generation of oscillations of either readily controllable frequency or of highly stabilized frequency.

It is a still further object of the invention to provide simple and compact apparatus of relatively high efficiency which may be used to effect a desired amount of frequency or amplitude modulation of a magnetron oscillator with a minimum amount of distortion.

The invention represents an improvement over the invention disclosed in U. S. Patent 2,490,007, of Phillip H. Peters, Jr., assigned to the assignee of the present invention. In the aforementioned Peters application a magnetron device having an oscillator section and a reactance section are employed in a system similar to the system to be hereinafter described. In the present application the function of these two magnetrons are taken over by a single magnetron having a grid and being connected into a system in a manner to be hereinafter described.

The frequency of a magnetron oscillator is determined in part by the magnitude of the electric field between the cathode and anode of the magnetron assuming that the axial magnetic field is kept constant. If a grid is located in the magnetron between the cathode and anode then the frequency of oscillation developed by the magnetron oscillator is determined in part by the electric field intensity in the grid-anode region. The potential between the cathode and the grid of this magnetron controls the amount of current flowing in the magnetron, and hence, determines the amplitude of the oscillations developed by the magnetron. If the potential between the grid and the anode is kept constant and the potential between the grid and the cathode is varied then the oscillations developed tend to have a constant frequency but vary in amplitude in accordance with the variations in the grid-cathode potential. If the potential between the cathode and grid is kept constant and potential between the anode and the grid is varied then the frequency of oscillations developed by the magnetron oscillator changes while the amplitude remains constant. Utilizing these principles, I have provided a system whereby the foregoing objects may be readily achieved.

According to the exemplary embodiment hereinafter to be described and in accordance with principles set forth in the preceding paragraph, the objects of the invention are accomplished by the provision of a first circuit having elements which apply a corrective voltage factor between the grid and the anode of the magnetron oscillator tending to compensate for any undesirable random variations of the frequency from a standard frequency derived from a second circuit, that is, the oscillator frequency tends to maintain at all times a fixed relation to the standard frequency whether the latter is fixed or variable. By modulating the standard frequency in accordance with signals introduced into the second circuit, it thereby becomes possible to frequency modulate the magnetron oscillator in accordance with the desired signal. By virtue of the relative independence of a first circuit, desirable frequency changes attributable to the frequency modulation are unaffected by the corrective action of the first circuit while the undesirable frequency changes attributable to random frequency fluctuations of the magnetron oscillator itself are so effected and their effect thereby eliminated. Likewise by the provision of an inverse feedback circuit responsive to amplitude variations, the output of the magnetron is maintained substantially constant in the absence of amplitude modulation of the magnetron. When the magnetron is amplitude modulated the inverse feedback circuit functions to improve the linearity of the amplitude modulation.

Figures 2A, 2B:
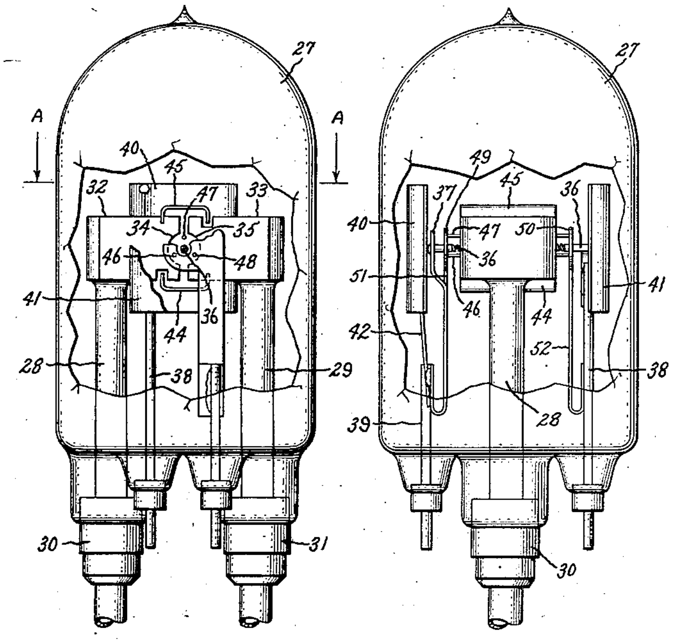
Figure 2C:
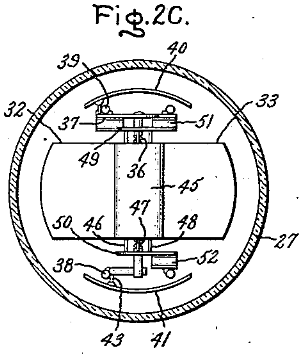

The features of the invention desired to be protected are pointed out in the appended claims. The invention itself together with its further objects and advantages, may best be understood by reference to the following description and to the appended drawings in which Fig. 1 shows a schematic representation of a circuit illustrating the principles of the invention; Figs. 2A and 2B show two views of a magnetron device of the kind that may be used in the circuit of Fig. 1; Fig. 2C shows a view of the device of Fig. 2A taken along section A—A.

Referring now to Fig. 1, there is shown a magnetron oscillator 1 which may, for example, comprise an electron discharge device 2 of the magnetron type having two anode segments 3 and 4 and a grid 5 located between the anode and cathode 6. It will be understood that generally any of the magnetron devices having grids will be suitable for use in applicant's system. Preferably the grid should be of the permeable plane type which permits the passage of electrons from the cathode to the anode but which limits to a minimum the penetration of the electric field in the grid-anode space into the grid-cathode space. However, a plain wire grid such as shown in Fig. 2 of the drawing is suitable for the purpose of the invention. The magnetron is connected in energizing relationship to a resonant circuit, such as a parallel wire transmission line 7 comprising parallel wires 8 and 9 and which is preferably tunable by suitable means such as a short circuiting conductor 10 adjustably positionable longitudinally of the transmission line 7 by the rod 11. The grid 5 controls the frequency of oscillation in the magnetron 1 in supplement to the tuning of the conductor 10. It will be understood that when a suitable magnetic field is applied axially between anode and cathode and a suitable energizing potential such as those supplied by direct current sources, for example, battery 12 is applied between the respective cathode and anode, oscillations may be generated and sustained in the oscillator, and the frequency thereof may be controlled in part by controlling the voltage between the grid and the anode of the oscillator by means of conductor 13 in accordance with principles explained above. For the purpose of deriving useful energy from the oscillator, any suitable load connected to the transmission line may be provided, for example, the means indicated as resistor 14 may be an antenna coupled through a cable to a suitable point on the transmission line 7.

For the purpose of controlling the frequency in the oscillator and to minimize the effect of inherent random frequency fluctuations therein, there may be provided what may be termed a feedback loop circuit comprising any suitable energy pick-up device 15 such as a coaxial line 16 terminated at one end in conductive loop 17 having an inner conductor and outer conductor, a mixer 18, a limiter discriminator 19, and the unidirectional potential amplifier 20. All of the elements of the feedback loop are of types well-known in the art. The function of the mixer 18 is to combine a voltage component of frequency $F_0$ derived inductively from the oscillator through coupling loop 17 and the coaxial line 16 with a voltage component of standard frequency $F_1$ derived from a local oscillator hereinafter to be described. From the mixer 18 there is obtained a voltage component of frequency equal to the difference of frequency between the two frequencies $F_1$ and $F_0$, that is, frequency $\Delta F$. This voltage component of frequency $\Delta F$ is applied to the limiter discriminator 19 which performs the function of providing as output a unidirectional voltage component which is directly proportional to the differential frequency $\Delta F$. As will be understood by those skilled in the art, numerous circuit arrangements for performing the latter function are available in the art. Generally they perform the function in two steps as follows. First, any undesirable effects due to the amplitude variations in the differential frequency $\Delta F$ are eliminated by limiting or stabilizing the amplitude of the differential frequency component, and secondly, the differential frequency component now of fixed amplitude is so rectified as to provide a unidirectional voltage directly proportional to the differential frequency $\Delta F$. By the two steps there is provided at the output of the limiter discriminator a voltage which is solely a measure of the frequency difference $\Delta F$.

The output of the limiter discriminator 19 may next be applied to the direct current amplifier 20, if desired or necessary, and in turn the amplified voltage may be applied to the grid 5 of the magnetron oscillator through conductor 13 in such a manner as to control the frequency output in accordance with the value of $\Delta F$. As explained above, any changes in frequency of the oscillator may be compensated for by changing the grid-anode potential which is done in accordance with the correction voltage derived from the limiter discriminator. As shown, the correcting voltage derived from the limiter discriminator 19 and amplifier 20 is connected in series with the bias battery 21 between the cathode 6 and the grid 5.

It will be understood by those skilled in the art that the circuit as thus far described may be made to operate to stabilize the frequency oscillation about a center frequency against random fluctuation in the following manner. The circuit may be adjusted to be balanced at a desired frequency of the oscillator by appropriate choice of circuit parameters. Generally, frequency $F_1$ of the local oscillator 22 will be so chosen with respect to the desired mean frequency $F_0$ of oscillator as to provide a conveniently handled predetermined intermediate frequency $\Delta F$, for example, $\Delta F$ equal to 30 megacycles. When the oscillator 1 is oscillating at the desired frequency, the limiter discriminator 19 will be so designed that it develops zero output voltage at $\Delta F$ equal to the predetermined intermediate frequency. Undesired frequency deviations, random or otherwise, of the oscillator 1 will then vary $\Delta F$ in such a manner as to cause the limiter discriminator 19 to develop a unidirectional output voltage proportional to the deviation and a polarity determined by the direction of deviation. Assuming the frequency $F_1$ of the local oscillator 22 to be constant then it will be apparent that any changes in the frequency $F_0$ of the magnetron oscillator 1 which results in a $\Delta F$ different from the balanced value will give rise to a discriminator output voltage which may be applied to the grid 5 in such a manner as to change the electric field in the grid-anode space and consequently to compensate for the frequency fluctuation which caused the unbalance; that is, to say, the oscillator is returned to the desired mean frequency by the change in the grid-anode voltage.

In order to develop oscillations of variable frequency in accordance with a desired signal the voltage between the cathode 6 and the grid 5 of the magnetron oscillator 1 is kept constant and the local oscillator frequency is modulated by a frequency modulator 23 in a manner to cause the frequency of the oscillator 1 to change. Various circuits may be utilized for modulation of the local oscillator 22, for instance, the circuits disclosed in the aforementioned Peters application may be used for modulation of the local oscillator.

In order to develop oscillations of constant frequency but variable amplitude in accordance with a signal supplied to the amplitude modulator 24 the voltage between the grid and anode is kept constant by means of feedback circuit and the anode-cathode voltage is varied in a manner to cause the amplitude of the oscillations to change. In effect, this means that the grid to cathode voltage is varied to cause the amplitude modulation since the grid to anode voltage is maintained substantially constant. The amplitude modulator 24 may be an amplifier which applies amplified audio signals derived from the microphone 25 through transformer 26 to the magnetron 2 as shown and described. It will be understood whether the system of the oscillator is being amplitude modulated or frequency modulated that any random frequency fluctuations are eliminated by means of feedback circuit described above.

In order to stabilize the amplitude of the oscillations developed by the magnetron when it is being frequency modulated, an inverse feedback loop 53 comprising a coupling loop 54, a transmission line 55, linear detector 56 and amplifier 57 connected as shown is preferably utilized. The linear detector 56 detects variations in amplitude of the oscillations developed by the magnetron. These amplitude variations are applied through amplifier 57 in inverse or degenerative phase to amplitude modulator 24 thereby to amplitude stabilize the magnetron oscillator output. The inverse feedback loop 53 improves the linearity of the amplitude modulation of the magnetron oscillator as well.

It will be understood by those skilled in the art that other circuits than the exemplary circuit described above for developing control potentials in response to frequency departure from a center or stabilized frequency may be utilized, for instance a resonator tuned so as to develop an output have a magnitude and sense dependent on the magnitude and sense of frequency departure could as well be used. With the arrangement suggested in the latter example the local oscillator is eliminated and controllable frequency modulation may be obtained by varying the unidirectional potential applied between grid and anode in accordance with the modulating signal.

Referring now to Figs. 2A, 2B, and 2C of the drawing, there is shown by way of example a magnetron device of the kind that may be used in the system of Fig. 1. The magnetron device includes an evacuated envelope 27 formed of glass, in which is mounted a pair of parallel conductors 28 and 29 which may to advantage be formed of copper tubing. These conductors extend through the end wall of the envelope 27 and are sealed thereto by a suitable sealed construction, including sleeves 30 and 31 which are joined, respectively, to the envelope 27 and the conductors 28 and 29, and which may be made of any of a class of compositions well known in the art suitable for metal-to-glass sealing comprising the elements of nickel, iron and cobalt. The conductors 28 and 29 which extend to the exterior of the envelope 27 provide a parallel wire transmission line corresponding to the parallel wire transmission line 7 of Fig. 1. In the envelope 27 a pair of anode members 32 and 33 corresponding to the anode members 3 and 4 of Fig. 1 are supported in opposed relation from the conductors 28 and 29, respectively. The anode members 32 and 33 are spaced at the inner ends and are provided with arcuate surfaces 34 and 35, respectively, which cooperate to define the space charge chamber of the magnetron which is supplied with electrons by an elongated cathode 36. The cathode 36, which may comprise straight or coiled length of wire, is supported on the axis of the generally cylindrical space defined by the curved space portions 34 and 35 in the anode segments at one end by a resilient supporting conductor 37 and at the other end to relatively rigid supporting conductor 38. The supporting conductor 37 is secured to relatively rigid conductor 39. Conductors 38 and 39 are sealed to the end wall of the envelope in any suitable manner. Circular shielding members 40 and 41 are supported, respectively, from the flexible conductors 42 and 43 on opposite sides of the anode structure comprising elements 32 and 33 to prevent electrons escaping from the interelectrode space from impinging on the glass walls of the envelope 27. Also, shield members 44 and 45 may be connected to the anode members 32 and 33 in the manner shown and bent over the gaps between anode segments 32 and 33 to collect electrons escaping therefrom. The grid comprises three parallel wire members 46, 47 and 48 located between the cathode 36 and anode members 32 and 33 are supported at their respective ends by supporting conductors 49 and 50. These supporting conductors are secured to relatively rigid conductors 51 and 52, respectively, which are in turn sealed to the end wall of the envelope 27 in any suitable manner.

While I have shown and described particular embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. A system for generating electromagnetic oscillations and modulating the frequency thereof comprising an oscillator magnetron including a grid, a source of reference oscillations of precisely controllable frequency, means for maintaining the frequency of said oscillator magnetron at a fixed relation with respect to frequency of said source comprising means for deriving a voltage proportional to the difference in the frequency between the frequency of said oscillator magnetron and the frequency of said source and for applying said voltage to said grid to affect an adjustment of the frequency of said magnetron to maintain said fixed relation, and means for modulating the frequency of said source whereby the frequency of said magnetron is likewise modulated.

2. A system for generating electromagnetic oscillations and modulating the frequency thereof comprising an oscillator magnetron including a grid, means effective to adjust the frequency thereof, a source of reference oscillations of precisely controllable frequency, means for maintaining the frequency of said oscillator magnetron at a fixed relation with respect to the frequency of said source comprising means for deriving an electrical voltage of differential frequency equal to the difference between the frequency of said oscillator magnetron and the frequency of said source, means for deriving an unidirectional voltage proportional to said differential frequency and means for applying said unidirectional voltage to said grid means to affect an adjustment of the frequency of said magnetron to maintain said fixed relation, and means for varying the frequency of said source whereby the frequency of said magnetron is likewise varied.

3. A system for generating electromagnetic oscillations and modulating the frequency thereof comprising an oscillator magnetron including a grid, means effective to adjust the frequency thereof, a source of reference oscillations of precisely controllable frequency, means for maintaining the frequency of said oscillator magnetron at a fixed relation with respect to the frequency of said source comprising means for deriving an electrical voltage of differential frequency equal to the difference between the frequency of said oscillator magnetron and the frequency of said source, means for deriving an unidirectional voltage proportional to said differential frequency and means for applying said unidirectional voltage to said grid means to effect an adjustment of the frequency of said magnetron to maintain said fixed relation, means for stabilizing the amplitude of oscillations developed by said magnetron, and means for varying the frequency of said source whereby the frequency of said magnetron is likewise varied.

4. Magnetron apparatus comprising an oscillator magnetron including a grid, a source of reference oscillations of precisely controllable frequency, means for maintaining the frequency of said oscillator magnetron at a fixed relation with respect to the frequency of said source, comprising means for deriving a voltage proportional to the difference in the frequency between the frequency of said oscillator magnetron and the frequency of said source and for applying said voltage to said grid to effect an adjustment of the frequency of said magnetron to maintain said fixed relation.

5 Magnetron apparatus comprising an oscillator magnetron including a grid, a source of reference oscillations of precisely controllable frequency, means for maintaining the frequency of said oscillator magnetron at a fixed relation with respect to the frequency of said source, comprising means for deriving a voltage proportional to the difference in the frequency between the frequency of said oscillator magnetron and the frequency of said source and for applying said voltage to said grid to effect an adjustment of the frequency of said magnetron to maintain said fixed relation, means for stabilizing the amplitude of oscillations developed by said oscillator magnetron.

6. A system for generating electromagnetic oscillations and modulating the amplitude thereof comprising an oscillator magnetron including grid means effective to adjust the frequency thereof, a source of reference oscillations of precisely controllable frequency, means for maintaining the frequency of said oscillator magnetron at a fixed relation with respect to the frequency of said source comprising means for deriving a voltage proportional to the difference in frequency between the frequency of said oscillator magnetron and the frequency of said source and for applying said voltage to said first-mentioned means to effect an adjustment of the frequency of said magnetron to maintain said fixed relation, and means for modulating the amplitude of said oscillator magnetron.

7. A system for generating electromagnetic oscillations and modulating the amplitude thereof comprising an oscillator magnetron including grid means effective to adjust the frequency thereof, a source of reference oscillation of precisely controllable frequency, means for maintaining the frequency of said magnetron at a fixed relation with respect to the frequency of said source comprising means for deriving an electrical voltage of differential frequency equal to the difference between the frequency of said oscillator and the frequency of said source, means for deriving a unidirectional voltage proportional to said differential frequency, means for applying said unidirectional voltage to said first-mentioned means to effect an adjustment of the frequency of said oscillator magnetron to maintain a fixed relation, means for modulating the amplitude of said oscillator.

8. Apparatus for generating electromagnetic oscillations of stabilized frequency comprising a magnetron including an aanode, a grid and a cathode, said grid being located between said anode and said cathode, means for controlling the potential applied between said grid and said anode in response to departures from said stabilized frequency whereby oscillations of stabilized frequency are developed in said magnetron.

References Cited in the file of this patent

UNITED STATES PATENTS

| | | |
|---|---|---|
| 2,416,298 | Fisk | Feb. 25, 1947 |
| 2,468,127 | Smith | Apr. 26, 1949 |
| 2,490,007 | Peters | Nov. 29, 1949 |
| 2,528,241 | Peters et al. | Oct. 31, 1950 |
| 2,576,599 | Hansell | Nov. 27, 1951 |